(12) United States Patent
Van Den Dungen

(10) Patent No.: US 8,938,447 B2
(45) Date of Patent: Jan. 20, 2015

(54) DETERMINING AN AMBIENT PARAMETER SET

(75) Inventor: Wilhelmus Andreas Marinus Arnoldus Maria Van Den Dungen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 804 days.

(21) Appl. No.: 12/373,747

(22) PCT Filed: Jul. 12, 2007

(86) PCT No.: PCT/IB2007/052778
§ 371 (c)(1),
(2), (4) Date: Jan. 14, 2009

(87) PCT Pub. No.: WO2008/010158
PCT Pub. Date: Jan. 24, 2008

(65) Prior Publication Data
US 2010/0005062 A1    Jan. 7, 2010

(30) Foreign Application Priority Data
Jul. 17, 2006    (EP) .................................. 06117310

(51) Int. Cl.
*G06F 17/30* (2006.01)
*H04N 5/58* (2006.01)
(Continued)

(52) U.S. Cl.
CPC ........ *G06F 17/30265* (2013.01); *H05B 37/029* (2013.01); *H04N 5/64* (2013.01); *H04N 21/4131* (2013.01); *H04N 21/436* (2013.01); *H04N 21/44008* (2013.01); *H04N 5/58* (2013.01)

USPC .......................................... 707/722; 348/602

(58) Field of Classification Search
CPC .. G06F 17/30265; G11B 27/034; G06T 7/408
USPC ................. 707/706, 708, 722, 758, 913, 914; 348/602, 608, 832
See application file for complete search history.

(56) References Cited

U.S. PATENT DOCUMENTS 5,263,097 A * 11/1993 Katz et al. ...................... 382/190
5,604,812 A *  2/1997 Meyer ........................... 381/314
(Continued)

FOREIGN PATENT DOCUMENTS

EP          1473643 A2     11/2004
JP       2002132831 A       5/2002
(Continued)

OTHER PUBLICATIONS

Written Opinion.
(Continued)

*Primary Examiner* — Md. I Uddin

(57) ABSTRACT

An ambient controller system and a method of determining an ambient parameter set associated with a textual description are described. A database (19) comprises a plurality of files having content in the form of a picture, video, or even sound. Furthermore, each file comprises information related to a file content, e.g. in the form of a file name, or other attributes which are stored as part of the file. The textual description is used for obtaining a subset of files whose information matches the textual description (16). The method further comprises analyzing the subset of files (17) for obtaining the ambient parameter set related to the textual description. The ambient parameter set may then be used to control one or more ambient devices (15).

12 Claims, 3 Drawing Sheets

(51) Int. Cl.
*H05B 37/02* (2006.01)
*H04N 5/64* (2006.01)
*H04N 21/41* (2011.01)
*H04N 21/436* (2011.01)
*H04N 21/44* (2011.01)

(56) References Cited

U.S. PATENT DOCUMENTS

| | | | |
|---|---|---|---|
| 6,452,642 B1* | 9/2002 | Brett | 348/578 |
| 7,352,410 B2* | 4/2008 | Chou | 348/673 |
| 2002/0005435 A1* | 1/2002 | Cottrell | 236/46 R |
| 2002/0047646 A1* | 4/2002 | Lys et al. | 315/312 |
| 2002/0054075 A1* | 5/2002 | Youdenko et al. | 345/730 |
| 2002/0169012 A1 | 11/2002 | Eves | |
| 2002/0169817 A1* | 11/2002 | Eves et al. | 709/201 |
| 2003/0208482 A1 | 11/2003 | Kim et al. | |
| 2004/0059754 A1* | 3/2004 | Barghout et al. | 707/104.1 |
| 2005/0057691 A1* | 3/2005 | Dean et al. | 348/552 |
| 2006/0153469 A1* | 7/2006 | Gallagher | 382/254 |
| 2007/0091111 A1* | 4/2007 | Gutta | 345/591 |
| 2007/0183657 A1* | 8/2007 | Kidono et al. | 382/162 |
| 2007/0242162 A1* | 10/2007 | Gutta et al. | 348/645 |

FOREIGN PATENT DOCUMENTS

| | | |
|---|---|---|
| WO | 0208948 A2 | 1/2002 |
| WO | 2008010158 A1 | 1/2008 |

OTHER PUBLICATIONS

By Grevers et al.; Entitled: "Content-Based Image Retrieval by Viewpoint-Invariant Color Indexing" ISIS, Faculty of WINS, University of Amsterdam, The Netherlands. Elsevier; Image and Vision Computing 17 (1999) pp. 475-488.

\* cited by examiner

DETERMINING AN AMBIENT PARAMETER SET

FIELD OF THE INVENTION

The present invention relates to a method of determining an ambient parameter set associated with a textual description, such as a word or sentence. The ambient parameter set may comprise one or more sensor parameters, such as background lighting color, light intensity, but also background audio or even scent.

BACKGROUND OF THE INVENTION

The article 'Content-based image retrieval by viewpoint-invariant color indexing' by Theo Gevers and Arnold W. M. Smeulders, Image and Vision Computing 17 (1999), pp. 475-488, discloses a method for image retrieval using color information indexing. Large amounts of (picture) files can be analyzed by using the color information in the pictures. The method may be applied to find a large number of files in which the same object is contained as in an image example (but possibly from a different viewing angle, and lighting conditions). Only the color information in the files is used in this method.

American patent application US2003/0208482 discloses systems and methods of retrieving relevant information from Internet pages, using keywords or combinations of keywords. The disclosed searching and ranking method is completely text-based.

International patent application WO02/008948 describes a method and system for indexing, searching, identifying and editing portions of electronic multimedia files. For example, textual information in a graphic form in multimedia files may be extracted therefrom and added to the file as a tag or bookmark.

OBJECT AND SUMMARY OF THE INVENTION

It is an object of the present invention to provide a method of finding ambient parameter set values associated with a specific textual description of an ambiance, such as 'sunset' or 'autumn'.

According to the present invention, a method as mentioned in the opening paragraph is provided, which method comprises searching a database, the database comprising a plurality of files. The files may comprise content in the form of a picture, video, or even sound. Furthermore, each file comprises information related to a file content, e.g. in the form of a file name, or other attributes which are stored as part of the file. The textual description in the form of a word or sentence reflecting a desired ambiance is used for obtaining a subset of files whose information matches the textual description. The method further comprises analyzing the subset of files for obtaining the ambient parameter set related to the textual description. The database may be a dedicated database, but may also be formed by the Internet, for which search engines may be used to find the files for this method.

In a further embodiment, the ambient parameter set comprises one or more of the group of light value, color value, sound indicator, or background noise indicator. The subset of files which match the textual description of the desired ambiance may be analyzed for one or more of these parameters. In a further embodiment, the ambient set of parameters may comprise spatial parameters, which take into account two-dimensional or even three-dimensional aspects of the ambiance.

In a further embodiment, the analysis of the subset of files comprises determining average parameter values for the ambient parameter set from the subset of files. Determining an average parameter value of a large group of files will provide a trustworthy indication of the relevant value for the respective ambient parameters. By using the Internet, or another large public database, a good translation of the textual description, e.g. 'sunset', into a subset of files comprising a picture, video, audio sample, light, or ambient atmosphere is possible, all of which features represent 'sunset'. This is due to the use of a large number of files, for which all of a large number of people have given the description 'sunset'. The subset of files is thus also an idea shared by a large group of people of the textual description 'sunset'. Such a common idea may even be geographically different. For example, the common idea of a textual description like 'sunset' or 'soccer' may be different when the database is searched only locally (which is e.g. possible in most search engines for searching on the Internet). The textual description 'soccer' may result in a different subset of files in the Netherlands as compared to e.g. Japan.

In a further embodiment, the method further comprises setting an ambient device, using the ambient parameter set. The ambient device may include, but is not limited to, a lighting application device, or an ambilight home entertainment device, etc. In a further embodiment, the method may comprise selecting the file from the subset of files which best matches the obtained ambient parameter set. For example, the file with the picture which best presents the textual description associated with a desired ambiance may be selected, and may e.g. be displayed on a screen or the like.

In another embodiment, the plurality of files comprises pictures or images, and analyzing each file comprises dividing each file into regions, e.g. top, middle, and bottom, and analyzing each region to obtain localized ambient parameters for each region as part of the ambient parameter set. In this manner, the ambiance may be controlled in a more sophisticated manner, and lighting may e.g. be controlled differently for high, middle and lower lighting of an ambient lighting device.

In a further aspect, the present invention relates to an ambient controller system for an ambient device which allows having an ambient characteristic, e.g. background lighting, but also background sound/noise, scent, etc. The ambient controller system is arranged to receive an ambient parameter input, e.g. in the form of an input of a word or sentence, or a choice from a preset number of words, to determine an ambient parameter set for the ambient characteristic on the basis of the received ambient parameter input and using the method in accordance with any one of the embodiments of the method described above, and to control the ambient characteristic of the ambient device, using the ambient parameter set.

Furthermore, the present invention relates to an apparatus comprising an ambient controller system according to the present invention, and one or more ambient devices connected to the ambient controller system. Examples of such an apparatus include, but are not limited to, television sets provided with ambilight devices. Other examples include ambient systems, in which two-dimensional or three-dimensional location models are used.

Furthermore, the present invention relates to a computer program product comprising a computer-executable code which, when loaded in a computer system, enables the computer system to carry out a method in accordance with any one of the embodiments of the method. The invention also relates to making such a computer program product available.

These and other aspects of the invention are apparent from and will be elucidated with reference to the embodiments described hereinafter.

DESCRIPTION OF EMBODIMENTS

Figure 1:
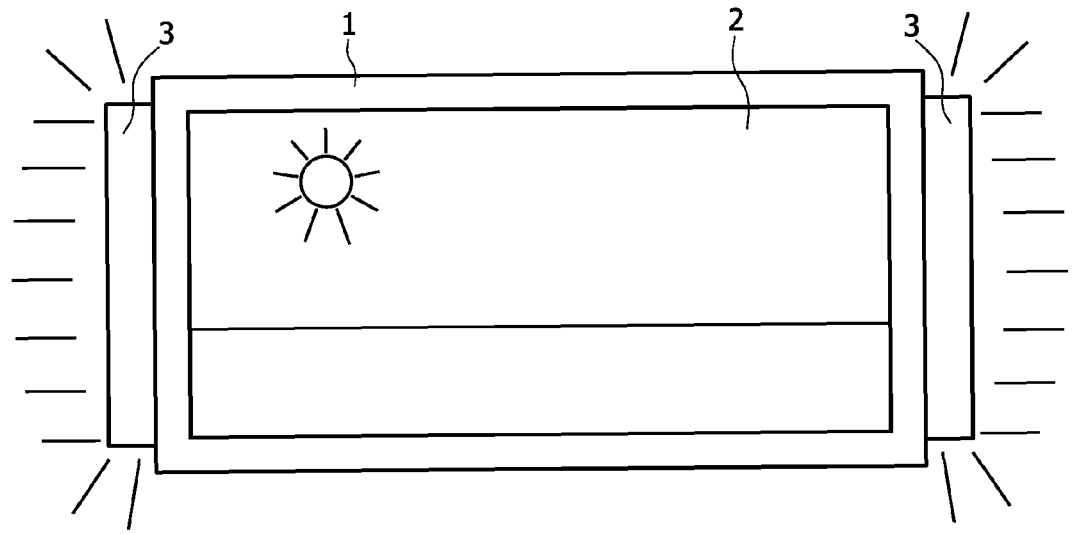
FIG. 1 is a schematic view of a television set in which the present invention may be embodied.

FIG. 1 shows an example of a device in which the present application may be embodied and utilized. FIG. 1 is a front view of a television set 1, which is provided with a screen for showing an image or picture 2. Furthermore, the television set 1 is provided with a set of ambient lighting devices 3, which are arranged to provide lighting of a specified color (or background lighting) to the environment of the television set 1. By varying the specified color, the perceived environment (or ambiance) of the television set may be varied.

The specified color may be set at a fixed color value, or it may vary in dependence on the actual picture 2 (or video frame) shown on the television set 1.

According to the present invention, a method is provided which allows obtaining an ambient parameter set associated with a textual description of a desired ambiance. The ambient parameter set may comprise e.g. a color value, an intensity value, a hue value, or a combination thereof. Furthermore, the ambient parameter set may comprise further items, such as background sound, or background noise, or any other sensor parameter, such as provided by various lighting devices, fans, air-conditioning equipment, devices for spreading smells or odors, audio and video devices of various types, rumbles, etc. The present invention allows a better definition of the ambient content as used in ambient applications, using a large database of pictures, and a more precise linkage of an interpretation of ambient content.

Figure 2:
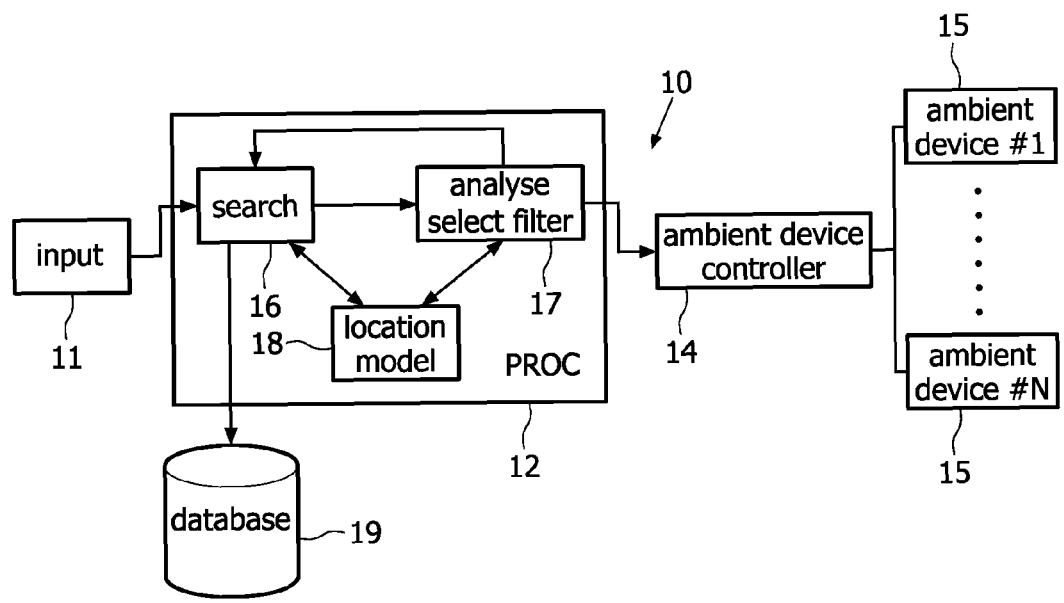
FIG. 2 is a schematic block diagram of an embodiment of an ambient controller system according to the present invention.

FIG. 2 is a schematic diagram of an embodiment of an ambient controller system 10 according to the present invention. The ambient controller system 10 may be connected to, or may even be part of, an ambient device 15, such as the ambient lighting devices 3 mentioned above. The ambient controller system 10 comprises a processor 12. The processor 12 may be a single central processing unit, a multiprocessor arrangement (e.g. a multicore processor), or even a distributed processor arrangement. The processor 12 is arranged to execute program instructions stored in a memory device which is part of the processor 12. The memory device may be any form of a volatile or non-volatile memory, e.g. semiconductor memory modules, a magnetic disc storage device, an optical disc storage device, etc. The present method may be implemented as a computer program, which may be stored on a computer program product such as an optical disc, or may be made available, e.g. for downloading or storage.

The processor 12 is connected to an input device 11, e.g. in the form of a keyboard, an array of switches, a touch screen, etc., for receiving input from an operator of the ambient controller system 10. Furthermore, the processor 12 is connected to an ambient device controller 14. The processor 12 may be arranged to execute the method as will be described in more detail below, using the functional blocks indicated in FIG. 2, a search function block 16, an analyze/select/filter function block 17 and an optional location model block 18. Furthermore, the processor 12 may be arranged to store the ambient parameter set in the memory device, but it may also be arranged to use the ambient device controller 14 for connection to an ambient device 15 and for sending the ambient parameter set to the connected ambient device 15.

The processor 12 is also connectable to a large database 19, such as the Internet, using appropriate interfacing means such as an Internet modem or router, in combination with appropriate software applications, such as an Internet browser.

A huge amount of information is available on the Internet. Moreover, by using suitable search engines, files may be found which comprise a multimedia content (such as a picture, sound or video file) together with some (textual) information, e.g. in the form of a name of the file, or other attributes comprised in the file. Of course, also a dedicated database 19 comprising a plurality of such multimedia files may be used.

The present invention allows using an average interpretation of an ambient description by finding and analyzing a large number of files comprising (textual) information matching the textual description of the desired ambiance.

Figure 3:
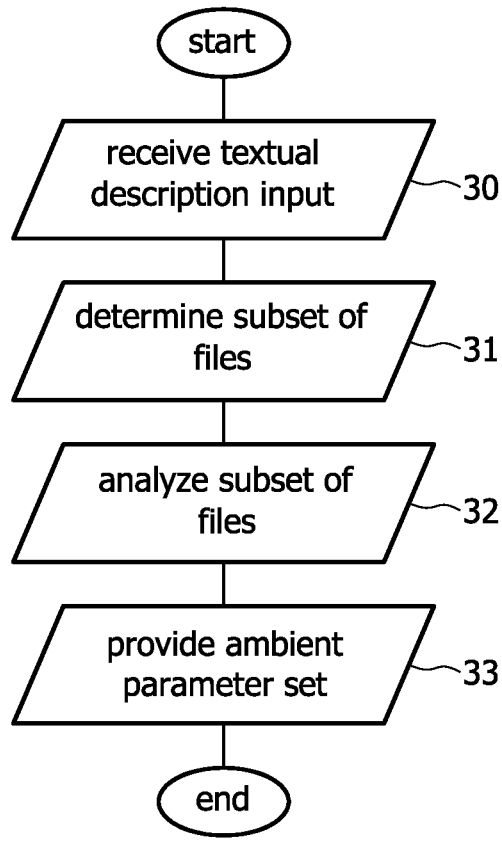
FIG. 3 is a flow diagram of an embodiment of the method according to the present invention.

This is shown schematically in the flow diagram of FIG. 3. In a first step 30, a textual description of a desired ambiance is input, e.g. by entering text, or selecting a textual description from a list of descriptions. In a subsequent step 31, a subset of files is determined, whose (textual) information matches the textual description. When using the Internet as a large database, search engines may be used to find e.g. picture files on the basis of one word or a sentence. This step 31 may e.g. be implemented in the search function block 16 of the processor 12. Then, in step 32, the subset of files matching the search word or words may be analyzed, e.g. for colors in the picture, or even in different parts of the picture. By analyzing a large number of these pictures, a very good reading of the colors representing the word or words may be found. The colors representing the word or textual description of the desired ambiance may be provided as an ambient parameter set in the next step 33, e.g. by storing the values for color, hue, saturation, intensity, etc. These steps 32, 33 may e.g. be implemented in the analyze/select/filter function block 17 of the processor 12. In order to obtain a better result, the analysis/select/filter function block 17 may be arranged to filter out bad or incorrect files. This may be called a best average technique, as outliers or erroneously selected files are filtered out. A search using the textual description 'sunset' may e.g. result in a subset of ninety picture files. An ambient parameter set is determined by means of the best average technique, and it may then also be determined that eighty files are indeed pictures relating to a sunset, and ten pictures may be determined as being erroneous. These ten erroneous pictures may then be removed from the subset of files.

The obtained ambient parameter set may be used in various manners. As explained above with reference to FIG. 2, an ambient device 15 may be controlled by using the ambient parameter set. For example, the ambient lighting device 3 of the television set 1 may be controlled to provide background lighting in accordance with the ambient parameter set. Furthermore, the ambient parameter set may also be used to find the file in the subset of files, which best matches the textual description, and use this file as content for a picture viewer.

In further embodiments, the ambient parameter set may comprise more or other parameters, such as audio or noise parameters. Moreover, one or more parameters of the ambient parameter set may be a function of time, e.g. a change of color over time.

Figure 4:
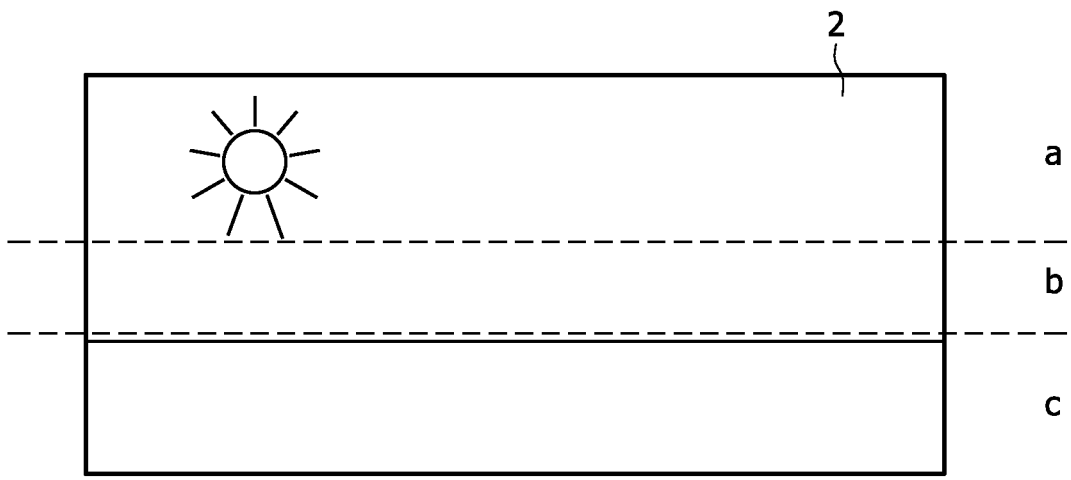
FIG. 4 is a schematic view of a subdivision of a picture as used in a further embodiment of the present invention.

In an embodiment, a picture search application was used to find picture files related to a specific word (e.g. 'sunset'). A set of forty files was found, and analyzed for color content. In this embodiment, the picture 2 was divided into three analysis regions a, b, and c, as shown in FIG. 4 (top, middle and bottom part of picture 2, respectively.). Each region a, b, c was analyzed for color content and the results were stored. The average (or alternatively the sum) of the analyzed colors provides a spectrum of colors representing the textual description 'sunset' with location information top, middle and bottom. The spectrum of colors thus obtained is stored as the ambient parameter set. Using this information, pictures may be selected that comply with the ambient information stored in the ambient parameter set, and the selected pictures may be used as content. The selected pictures may e.g. be shown on displays in a room. Furthermore, the ambient parameter set may be used to control further devices, e.g. the lights in a room, based on both color and location information in the ambient parameter set.

In a variant of this embodiment, not only files with pictures matching the textual description of the desired ambiance may be searched, but also video files or audio files may be searched. The video files eventually selected may be played on the displays in the room, and the audio files may be played through a speaker system, e.g. as background sound at a low volume ('audio wallpaper'). Also other types of files which allow providing any type of sensory information in a room or space may be searched by using the present invention.

Figure 5:
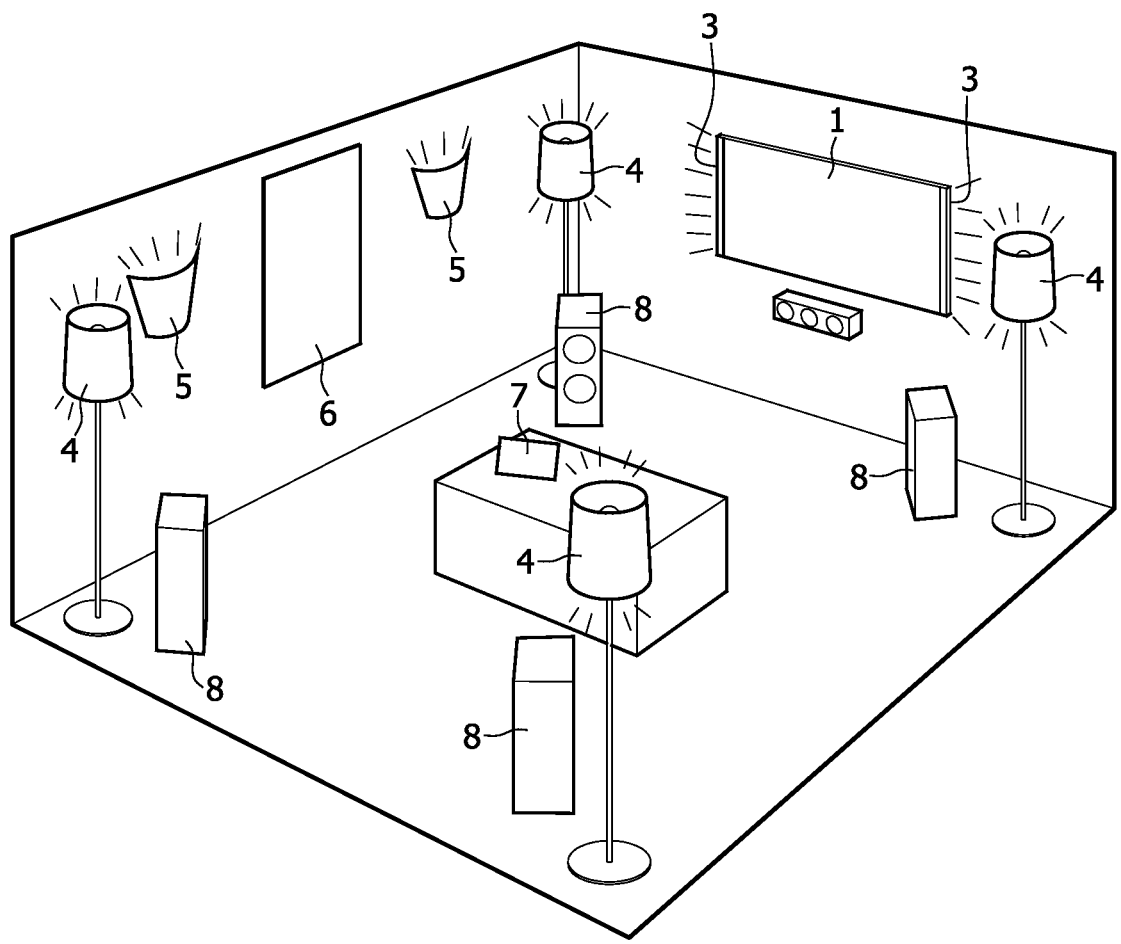
FIG. 5 is a schematic view of a room provided with a number of ambient device types, in which the present invention may be applied.

FIG. 5 is a schematic presentation of a room in which a number of different types of ambient devices 15 are present. A television set 1 equipped with an ambient lighting device 3 as shown in FIG. 1 is positioned on a first wall. Furthermore, a number of standing lamps 4 and wall lights 5 are present, which are arranged to provide light with a variable color and/or intensity. An electronic painting 6, which is arranged to show a painting, is positioned on a further wall. In this room, there is a remote control 7, which may be arranged to control a number of functions (e.g. a home automation system), and which has a display screen. Finally, an audio system equipped with a number of speaker elements 8 is present in the room.

In a further embodiment, the ambient parameter set comprises spatial parameters. The spatial parameters may comprise the parameters mentioned hereinbefore, with a two-dimensional or three-dimensional character. These may be advantageously used in a complete set-up of ambient devices, such as the room with a number of ambient devices 15. The location and type of ambient device 15 may be stored in a location model, which is then used in a location model function 18 of the processor (see FIG. 2). The analyze/select/filter function block 17 may then be arranged to provide a multimodal, multidimensional ambient parameter set, which can be used to drive the ambient devices 15 in the room. This multimodal, multidimensional ambient parameter set is a more complex variant of the ambient parameter set described with reference to FIG. 4.

For example, when a user inputs the ambient textual description 'sunset' in the input device 11, an ambient parameter set is determined as described in the various embodiments above. Colors are selected for each standing lamp 4 and wall light 5, depending on their location in the room. A video film of a sunset is played on the television set 1, and the electronic painting 6 changes to a sunset painting. Moreover, the remote control 7 may be controlled to display a sunset picture. The sound associated with the sunset video on the television set is output to the audio system speakers 8.

Some time later, the user may enter the textual description 'sea jet ski'. The standing lights 4 and wall lights 5 may then change color from yellow and orange tints to more bluish tints. The television set 1 may be set to play a video of sea and jet ski, and the electronic painting 6 may change to a relevant painting. The remote control 7 may also change picture, and the audio system speakers 8 may be set to play corresponding audio or noise.

In the sense of this application, the term 'ambiance' should not be interpreted only as ambient lighting of a television set 1 as described with reference to the embodiment above. It is also possible to use other devices which vary ambient lighting color conditions, such as lighting applications: users may vary the color of the lighting (or color composition of the lighting) by entering or selecting a word or several words which describe the desired effect. Other multimedia devices may also be arranged with an ambient device controller 10 as described above.

Furthermore, ambiance is not limited to lighting alone. The ambient parameter set may also comprise items related to e.g. ambient sound, ambient noise, or even other sensory items. In the described embodiment, e.g. when the textual description entered or selected is 'sea', it is possible to have the sound of breaking sea waves as background noise.

In this application, use of the verb 'comprise' and its conjugations does not exclude the presence of other elements or steps. Use of the article 'a' or 'an' does not exclude the presence of a plurality of the same items. Use of the term 'processor' 12 is also to be interpreted broadly, and includes a single processor or other unit or arrangement of units that are able to fulfill the functions described above.

Use of reference signs in the appended claims should not be construed as limiting the scope thereof.

The invention claimed is:

1. A method of controlling an ambient characteristic of at least one ambient device, the method comprising acts of:
   providing an ambient control system connected to a database having a plurality of files including multimedia content having a specific ambiance and a textual description of the ambiance, the database is selected from one or more locally and network connected databases;
   receiving a textual description of a desired ambiance as an input from an operator of the ambient control system;
   compiling a list of files of the plurality of files based on a match between the received textual description and the textual description of the files by dividing each file into regions and obtaining localized values for each region as part of a plurality of ambient parameters;
   for each file in the list of files
      identifying a plurality of ambient parameters corresponding to the received textual description, and
      determining an average value of each of the plurality of ambient parameters;
   creating an association between the received textual description and the average values of the plurality of ambient parameters including region information of the ambient parameters; and
   controlling the ambient characteristic of the at least one ambient device based on the association and selecting the multimedia content to display in a room based on the association,
   wherein the ambient characteristic includes background sound, and scent.

2. The method of claim 1, wherein the plurality of ambient parameters comprises one or more of light value, color value, sound indicator, and background noise indicator.

3. The method of claim 1, wherein the plurality of ambient parameters comprises spatial parameters.

4. The method of claim 1, further comprising an act of identifying a first file of the plurality of files having the plurality of ambient parameters that best matches the received textual description.

5. The method of claim 1, wherein the multimedia content in the plurality of files comprises pictures and the act of compiling comprises.

6. A system for controlling an ambient characteristic of at least one ambient device, the system comprising:
 a database having a plurality of files including multimedia content having a specific ambiance and a textual description of the ambiance, the database is selected from one or more locally and network connected databases;
 a controller configured to:
  receive a textual description of a desired ambiance as an input from an operator of the controller,
  compile a list of files of the plurality of files based on a match between the received textual description and the textual description of the files by dividing each file into regions and obtaining localized values for each region as part of a plurality of ambient parameters,
  for each file in the list of files:
   identify a plurality of ambient parameters corresponding to the received textual description, and
   determining an average value to each of the plurality of ambient parameters, and
  create an association between the received textual description and the composite values of the plurality of ambient parameters including region information of the ambient parameters; and
  control the ambient characteristic of the at least one ambient device based on the association and selecting the multimedia content to display in a room based on the association,
 wherein the ambient characteristic includes background sound, and scent.

7. The system of claim 6, wherein the at least one ambient device comprises one or more ambient devices connected to the controller.

8. A non-transitory computer-readable medium including a computer program product comprising computer-executable code which, when executed by a computer performs a method of controlling an ambient characteristic at least one ambient device, the method comprising acts of:
 providing an ambient control system connected to a database having a plurality of files including multimedia content having a specific ambiance and a textual description of the ambiance, the database is selected from one or more locally and network connected databases
 receiving a textual description of a desired ambiance as an input from an operator of the ambient control system;
 compiling a list of files of the plurality of files based on a match between the received textual description and the textual description of the files by dividing each file into regions and obtaining localized values for each region as part of a plurality of ambient parameters;
 for each file in the list of files
  identifying a plurality of ambient parameters corresponding to the received textual description, and
  determining an average value to each of the plurality of ambient parameters;
 creating an association between the received textual description and the composite values of the plurality of ambient parameters including region information of the ambient parameters; and
 controlling the ambient characteristic of the at least one ambient device based on the association and selecting the multimedia content to display in a room based on the association,
 wherein the ambient characteristic includes background sound and scent.

9. The non-transitory computer-readable medium of claim 8, wherein the plurality of ambient parameters includes at least one parameter that controls at least one of a light, a color, a sound, and a background noise.

10. An ambient control system comprising:
 at least one ambient device;
 a database having a plurality of files including multimedia content having a specific ambiance and a textual description of the ambiance, the database is selected from one or more locally and network connected databases; and
 a processor configured to:
  receive a textual description of a desired ambiance as an input from an operator of the ambient control system,
  compile a list of files of the plurality of files based on a match between the received textual description and the textual description of the files by dividing each file into regions and obtaining localized values for each region as part of a plurality of ambient parameters;
  for each file in the list of files
   identify a plurality of ambient parameters corresponding to the received textual description,
   determining an average of value each of the plurality of ambient parameters, and
  create an association between the received textual description and the composite values of the plurality of ambient parameters including region information of the ambient parameters; and
  control an ambient characteristic of the at least one ambient device based on the association and selecting the multimedia content to display in a room based on the association,
 wherein the ambient characteristic includes background sound, and scent.

11. The system of claim 10, wherein the plurality of ambient parameters includes at least one parameter that controls at least one of a light, a color, a sound, and a background noise.

12. The system of claim 10, wherein the processor is further configured to select a particular file from the plurality of files based on the plurality of ambiance parameters.

* * * * *